United States Patent [19]
Surdyk

[11] 3,874,990
[45] Apr. 1, 1975

[54] FLAME-RETARDANT PARTICLE-BOARD AND PROCESS FOR MAKING SAME

[75] Inventor: Lyle V. Surdyk, Chester, Calif.

[73] Assignee: Collins Pine Company, Portland, Oreg.

[22] Filed: June 13, 1973

[21] Appl. No.: 369,770

[52] U.S. Cl.............. 161/261, 106/15 FP, 117/137, 161/168, 161/403, 161/270, 260/15, 260/17.3, 264/122, 264/128
[51] Int. Cl.................. B32b 5/16, B32b 21/02
[58] Field of Search .......... 161/403, 162, 168, 261; 117/137; 264/115, 128, 122; 260/15, 17.3, 260/DIG. 24; 106/15 FP; 252/8.1

[56] References Cited
UNITED STATES PATENTS

| | | | |
|---|---|---|---|
| 2,488,034 | 11/1949 | Pingree | 161/403 |
| 2,549,563 | 4/1951 | Barnstead | 260/17.3 |
| 2,628,946 | 2/1953 | Juda | 161/261 |
| 2,917,408 | 12/1959 | Goldstein | 117/137 |
| 3,137,607 | 6/1964 | Goldstein | 161/403 |
| 3,159,503 | 12/1964 | Goldstein | 117/137 |
| 3,213,045 | 10/1965 | Klein | 161/262 |
| 3,321,421 | 5/1967 | Pataki | 161/403 |
| 3,383,274 | 5/1968 | Gaig | 161/403 |
| 3,438,847 | 4/1969 | Chase | 161/166 |
| 3,649,397 | 3/1972 | Peters | 161/170 |
| 3,832,316 | 8/1974 | Juneja | 117/148 |

Primary Examiner—George F. Lesmes
Assistant Examiner—E. P. Robinson
Attorney, Agent, or Firm—Chernoff & Vilhauer

[57] ABSTRACT

High flame retardancy is imparted to particleboard by treating it in the course of fabrication with a combination of alkaline borate chemicals and flame-retardant phosphoric acid-dicyandiamide-formaldehyde resin. The alkaline borate chemicals, e.g., borax and boric acid, are dissolved and added to the wood chips prior to their conversion into flake form. Next the flame-retardant resin, comprised of phosphoric acid, melamine or urea, dicyandiamide and formaldehyde, is added to the comminuted wood flakes, either before they are dried or, following drying, at the blender at which a bonding resin such as urea resin is mixed preparatory to the forming of the mixture into mats and its pressing into panels.

4 Claims, 1 Drawing Figure

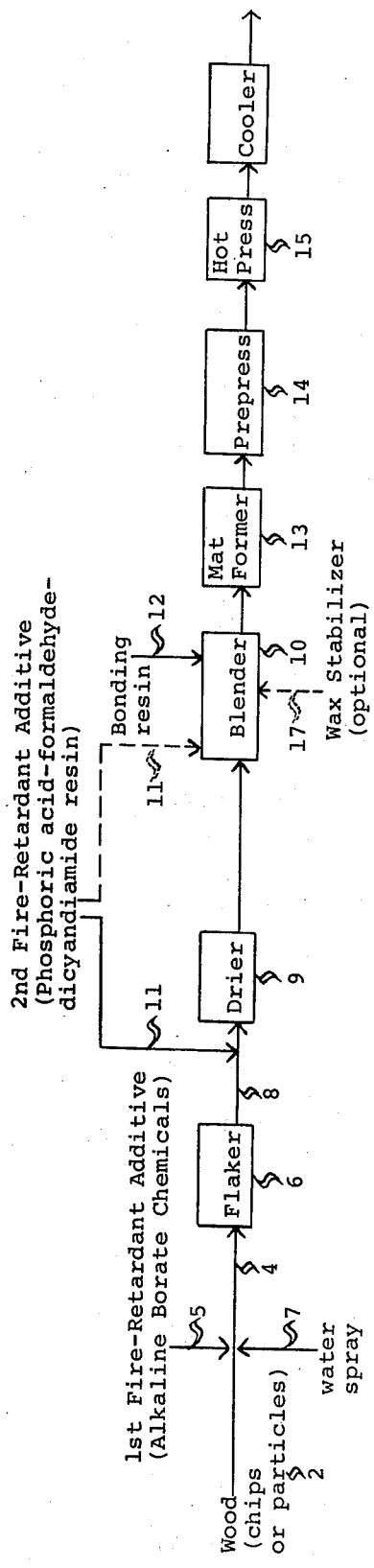

FLAME-RETARDANT PARTICLE-BOARD AND PROCESS FOR MAKING SAME

BACKGROUND OF THE INVENTION

The present invention is directed to flame-retardant particleboard and, more particularly, to a particleboard product having satisfactory structural integrity and strength for widespread application yet possession sufficient flame-retardant characteristics to meet Underwriters' Laboratories test standard 723 for Class I building materials.

Formulations for imparting flame-retardant characteristics to particleboard utilizing either alkaline borate chemicals or phosphoric acid-dicyandiamide-formaldehyde impregnating solutions are known to the prior art. For example Chase U.S. Pat. No. 3,438,847 and Pataki et al. U.S. Pat. No. 3,321,421 each disclose the use of borate chemicals, such as sodium borate, sodium tetraborate or the like, for mixing with a urea formaldehyde or melamine formaldehyde bonding resin to impart flame-retardant characteristics to the comminuted wood flakes as they are fabricated into particleboard panels. Similarly, Goldstein et al. U.S. Pat. No. 3,159,503 discloses a formulation for imparting fire-retardancy to particleboard utilizing an impregnating solution comprised of phosphoric acid, dicyandiamide and formaldehyde. Finally, an article by S. C. Juneja entitled "Stable and Leach-Resistant Fire Retardants for Wood" published in the June 1972 issue of *Forest Products Journal*, Vol. 22, No. 6, pp. 17–23, describes a fire-retardant resin formulation for particleboard comprised of melamine, dicyandiamide, phosphoric acid and formaldehyde.

While the aforedescribed prior art borate chemical and phosphoric acid-dicyandiamide-formaldehyde formulations are effective for the purpose of imparting good flame retardancy characteristics to comminuted wood flakes or chips, it has been found that, when such formulations are applied in effective amounts so that the resulting board product can successfully pass the Underwriters' Laboratories standards for Class I building materials, the press time for fabrication of the board is unduly lengthened and/or the strength, stability and other desirable physical characteristics of the board are deteriorated by the fire-retardant additives to the point that the board product is no longer suitable for many commercial applications. Furthermore, phosphoric acid-dicyandiamide-formaldehyde resin, while superior in certain respects to the borate chemical formulation, is corrosive and considerably more expensive when used in amounts sufficient to impart an equivalent degree of fire retardancy to the final board product. For these reasons the particleboard industry has been endeavoring for a number of years to develop an economical fire-retardant formulation, with which the comminuted wood particles can be impregnated in the course of their fabrication into particleboard, which would not materially lengthen the press cycle nor substantially weaken the board's desirable physical characteristics and yet would satisfy Class I fire retardancy standards and be widely usable for commercial applications interchangeably with untreated particleboard.

SUMMARY OF THE INVENTION

The present invention provides a process and formulation for treating particleboard to impart high flame-retardant characteristics (sufficient to comply with UL 723 test standards) and overcomes the aforementioned disadvantages of the prior art formulations by utilizing a combination of alkaline borate chemicals and phosphoric acid-dicyandiamide-formaldehyde resin, the proportion of each additive being maintained within predetermined ranges so that the fabrication time of the particleboard is not significantly prolonged and the resulting board product possesses satisfactory physical characteristics. The fire-retardant additives can be incorporated into a conventional particleboard fabrication process by the introduction of the constituent chemicals at appropriate stages in the process cycle as will hereinafter be more fully described.

In the preferred formulation, the comminuted wood is impregnated with the fire-retardant additives in an amount of 10 to 16% calculated solids based on the oven dry weight (BDW) of the wood, the additives preferably being 3% by weight of a fire-retardant resin comprised of phosphoric acid, dicyandiamide, formaldehyde and melamine (or urea) and the balance of from 7 to 13% by weight being alkaline borate chemicals, exemplarily a mixture of borax and boric acid.

DESCRIPTION OF THE DRAWING

The single FIGURE is a flow diagram illustrating the process for fabricating fire-retardant particleboard in accordance with the present invention.

DETAILED DESCRIPTION OF THE PREFERRED EMBODIMENT

Referring to the flow diagram which illustrates the manufacture of fire-retardant particleboard panels in accordance with the present invention, comminuted wood particles 2, either in the form of dry or green wood chips, flakes or planer shavings, or combinations thereof, and comprised of sugar pine, ponderosa pine, white fir or other wood species having a moisture content ranging from about 8% to 250%, are conveyed in metered amounts from a surge bin or storage silo on a conveyor 4 to a flaker 6 which comminutes the wood into flake form. Prior to the rendering into flakes and while the wood is carried on the conveyor 4, alkaline borate chemicals 5 are added to the wood material. In the preferred embodiment the borate chemicals are in the form of Polybor which is a proprietary borax-boric acid mixture in the ratio of 5 to 3 manufactured by U.S. Borax Company. Alternatively, sodium tetraborate, sodium octoborate or other borate chemicals in combination with an inorganic acid such as boric acid or hydrochloric acid could be used at this first additive station 5. The alkaline borate chemicals are discharged in dry form onto the top of the wood material as it is conveyed on the conveyor 4 and, to insure their subsequent infusion and impregnation of the wood particles, it is desirable that an aqueous environment be provided in the form of a fine water spray 7 for wetting the wood material and the deposited borate chemicals.

The wetted-down borate chemicals 5 and comminuted wood material 2 are then conveyed to the flaker 6 where the wood particles are sliced into flakes and the natural moisture present in the wood, as well as the added water from the spray, dissolves the borate and helps it to diffuse throughout the entire mass of the wood flakes. The flakes, now thoroughly diffused with the borate, are carried on conveyor 8 to a drier 9 where the mixture is dried to a uniform moisture content between 3% and 5% BDW. The dried flakes are metered to a blender 10 where a suitable bonding resin 12, exemplarily urea or melamine formaldehyde ranging from 2 to 8% BDW of the borate-infused wood, is added. The second fire-retardant additive, in the form of a phosphoric acid-formaldehyde-dicyandiamide resin 11, is introduced and mixed with the wood chips, either at the blender 10 where the bonding resin is introduced, or alternatively, and preferably, after the flaker 6 but prior to drying. One suitable method of introduction would be to spray the dicyandiamide-formaldehyde resin and phosphoric acid onto the wood particles utilizing a two-component atomizing nozzle.

After the blending station 10 the flakes containing the two fire-retardant additives 5 and 11, as well as the bonding resin 12, are then conveyed to the forming equipment 13–15 where the material is formed into mats and pressed under heat and pressure into panels. Thereupon the boards are cooled, stacked for additional cooling and sanded to uniform smoothness and thickness, as is conventional. To improve the dimensional moisture stability of the resulting board product, a suitable wax 17 in emulsion or molten form can be added if desired to the wood particle mix at the blender station 10 or elsewhere in the fabrication process.

While the aforedescribed process has been directed to the fabrication of a homogeneous, single-layer particleboard panel, it will be understood that, if desired, three-layer fire-retardant board, comprised of a core layer of relatively large size particles and two facing layers of finer-sized wood particles, could similarly be fabricated by ready modification of the process to include an extra mat forming heads so that both face and core material mats, treated with the fire-retardant formulation of the present invention, are produced and then assembled for pressing into panels.

An exemplary formulation for manufacturing a batch of the phosphoric acid-formaldehyde-dicyandiamide resin which is provided at the second fire-retardant additive station in the aforedescribed process would be as follows: 324 grams of 37% formaldehyde solution are mixed with approximately 40 grams of Polybor borate chemicals to adjust the solution to be slightly alkaline, about pH 8. (As an alternative to the Polybor borate, sodium hydroxide, sodium carbonate, ammonium hydroxide or other suitable alkaline material could be used to alkalyze the formaldehyde solution.) The solution is then heated to approximately 176° F. at which temperature all of the alkaline chemicals would be fully dissolved in solution, thus insuring that the solution has the necessary slight alkalinity to subsequently react satisfactorily with the melamine (or urea) and dicyandiamide. Thereafter 63 grams of melamine (or urea) and 126 grams of dicyandiamide are mixed together and added slowly to the alkalized formaldehyde solution under constant stirring and with the 176° F. temperature maintained. After all the melamine-dicyandiamide has been added, the solution is cooled to 70° F. and then 465 grams of 75% phosphoric acid is added to the resin so formed. The resin produced has approximately the following ratio of molecular weights: 0.5 moles of melamine, 1.50 moles of dicyandiamide, 4.00 moles of formaldehyde and 3.56 moles of phosphoric acid, with sufficient borate or other base material to adjust the pH of the resin to approximately 8 (slightly alkaline).

Based upon the bone dry weight of the wood, the total calculated solids content of the two fire-retardant additives lie within the range of 10–16%, with the borate chemical additive constituting no less than about 8% and the resin additive being in the range of 1% to 8%. The preferred proportions for producing Class I flame-retardant particleboard with the most desirable properties are 3% phosphoric acid-dicyandiamide-formaldehyde resin and 13% borate chemicals, e.g., Polybor borax-boric acid mixture. With higher percentages of borate to phosphoric acid-dicyandiamide-formaldehyde resin than the preferred relationship set forth above, longer press times are required and the strength and stability of the resulting board product are deleteriously affected. Conversely, with higher percentages of phosphoric acid-dicyandiamide-formaldehyde resin, while the press cycle for forming the board is reduced because the bonding resin cures more rapidly due to the higher acid content of the mixture, the strength of the resultant board product is materially reduced and the surface appearance of the board is less satisfactory.

In a laboratory test run, samples of homogeneous, single-layer particleboard panels of 15 inches × 17 inches × ½ inches dimensions were made containing various amounts of the two fire-retardant additives referred to above and were found to have the flame-retardant, strength and other physcial characteristics as set forth in the following table.

| Sample Group | Minimum Press Time (minutes) | Flame Spread (inches) | Modulus of Rupture (PSI) | Modulus Elasticity (PSI×10³) | Internal Bond Strength (PSI) | Water Absorption (% Moisture) | Thickness Swell (%) |
|---|---|---|---|---|---|---|---|
| A. 16% Polybor PDF resin | 7 | 9 | 1750 | 511 | 107 | 116 | 79 |
| B. 13% Polybor 0% PDF resin | 6½ | 11 | 1753 | 381 | 110 | 114 | 58 |
| C. 10% Polybor 0% PDF resin | 6 | 13 | 1751 | 392 | 114 | 111 | 60 |
| D. 15% Polybor 1% PDF resin | 4 | 9 | 1905 | 490 | 124 | 109 | 61 |
| E. 14% Polybor 2% PDF resin | 3½ | 9 | 2195 | 557 | 133 | 91 | 42 |
| F. 13% Polybor 3% PDF resin | 2½ | 9 | 2462 | 516 | 113 | 87 | 30 |
| G. 12% Polybor 4% PDF resin | 3 | 9 | 2240 | 571 | 138 | 84 | 33 |
| H. 11% Polybor 5% PDF resin | 3 | 10 | 2245 | 529 | 123 | 86 | 37 |
| I. 10% Polybor 6% PDF resin | 2¾ | 10 | 1970 | 457 | 131 | 86 | 37 |

"PDF" = Phosphoric acid-dicyandiamide-formaldehyde-melamine

A urea resin was used as the bonding agent for all board samples. "Minimum press time" was defined for purposes of the test run as that minimum time (including closing time of the press) at which the springback of the nominal ½ inch board thickness, immediately upon release from the press (press temperature 320° F.), was less than 0.010 inch. For testing flame spread, strength and other properties of the board material, all samples were pressed for 5 minutes except for specimens in groups A, B and C (borate chemicals alone) which required ten minutes press time in order for the bonding agent to cure sufficiently to hold the board together.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A process for manufacturing fire-retardant composite wood products comprising: forming comminuted wood particles; diffusing into said wood particles a fire-retardant alkaline borate chemical; adding to said wood particles a formaldehyde resin formed from formaldehyde, dicyandiamide, phosphoric acid and a reactant selected from the group consisting of urea and melamine; blending a curable bonding resin with said wood particles; and compressing said wood particles with sufficient pressure and temperature to cure the bonding resin to form a composite wood product.

2. The process according to claim 1 further including the step of drying the wood particles before the bonding resin is blended therewith.

3. The process according to claim 1 wherein said curable bonding resin is selected from the group consisting of urea-formaldehyde and melamine-formaldehyde.

4. A fire-retardant composite wood product formed by the process in claim 1.

* * * * *

UNITED STATES PATENT AND TRADEMARK OFFICE
CERTIFICATE OF CORRECTION

PATENT NO. : 3,874,990
DATED : April 1, 1975
INVENTOR(S) : Lyle V. Surdyk

It is certified that error appears in the above-identified patent and that said Letters Patent are hereby corrected as shown below:

Col. 1, Line 41      Change "buliding" to --building--.

Col. 2, Line 50      After "could" insert --also--.

In the Table at the bottom of Columns 3 and 4      In the row listing Sample Group A, before "PDF resin" insert --0%--.

Signed and Sealed this sixth Day of April 1976

[SEAL]

Attest:

RUTH C. MASON
Attesting Officer

C. MARSHALL DANN
Commissioner of Patents and Trademarks